No. 888,299. PATENTED MAY 19, 1908.
G. H. BENJAMIN.
EXTRUSION MACHINE.
APPLICATION FILED FEB. 7, 1908.
3 SHEETS—SHEET 1.
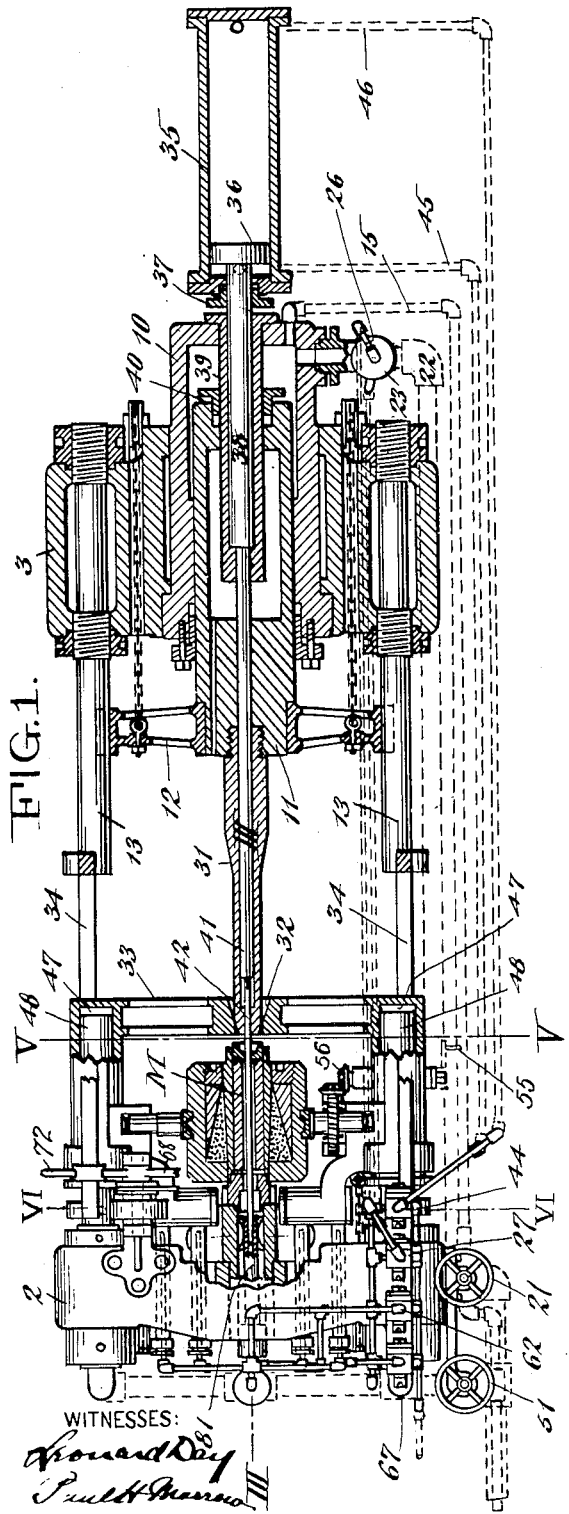
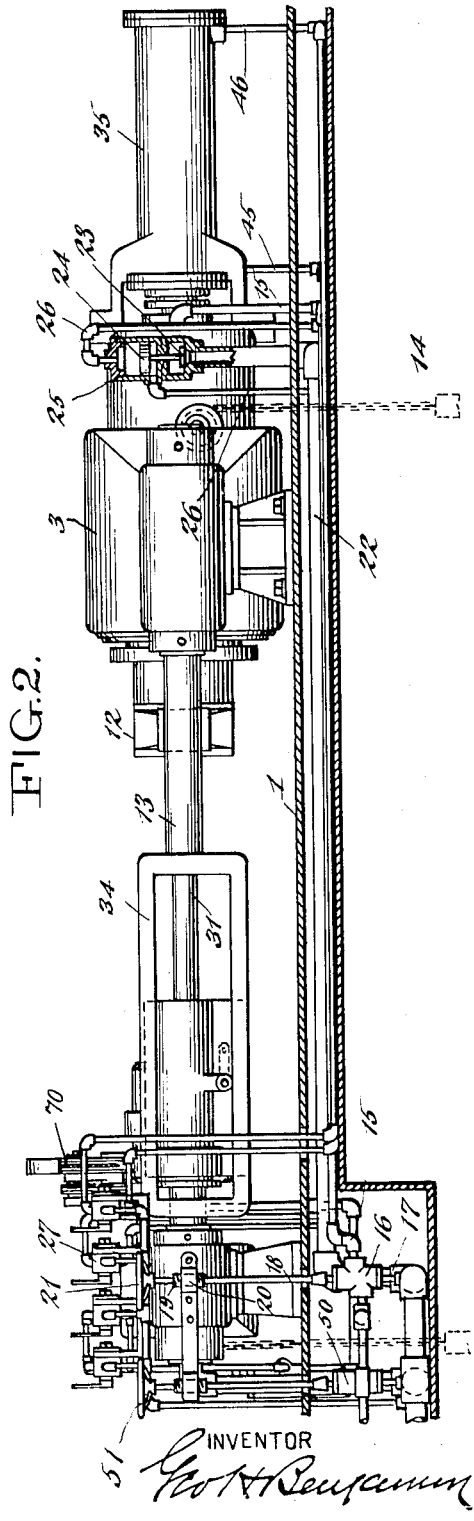
WITNESSES:
INVENTOR No. 888,299. PATENTED MAY 19, 1908.
G. H. BENJAMIN.
EXTRUSION MACHINE.
APPLICATION FILED FEB. 7, 1908.
3 SHEETS—SHEET 2.
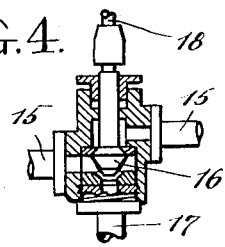
FIG. 3.
FIG. 4.
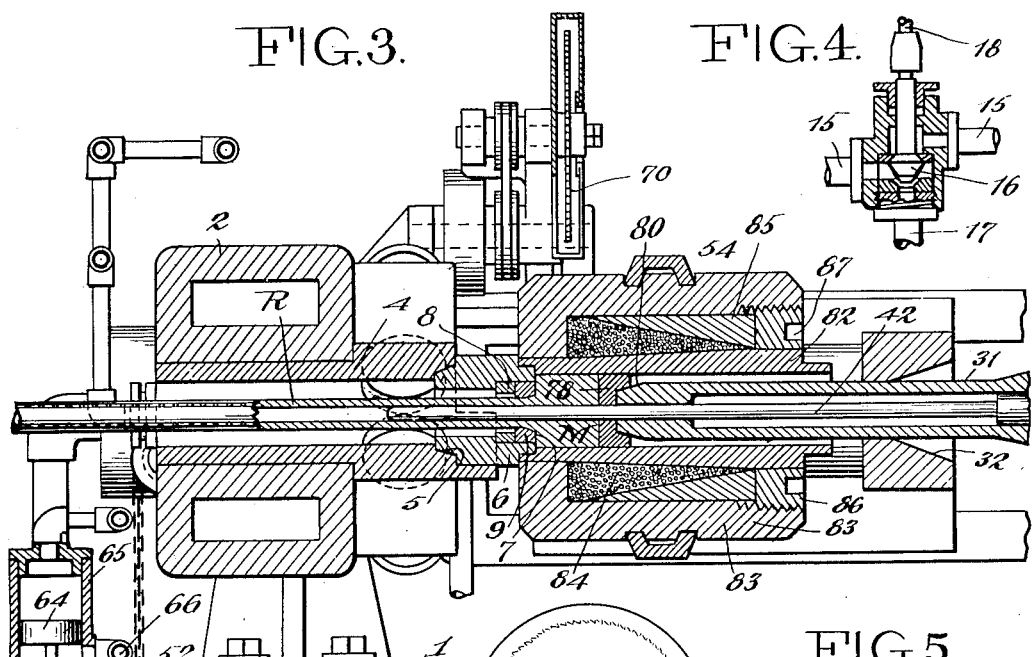
FIG. 5.
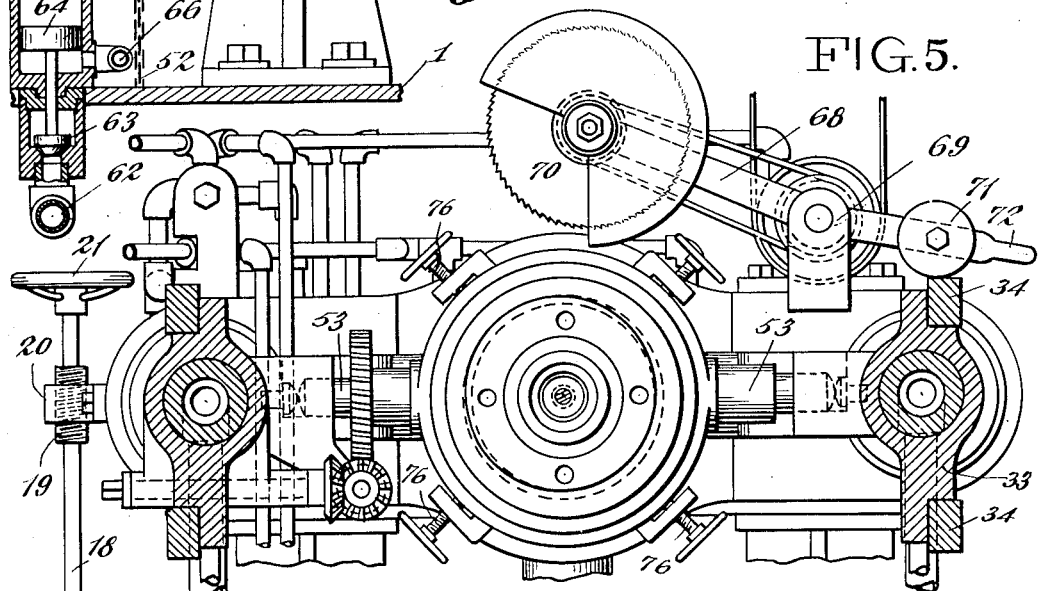
FIG. 7.
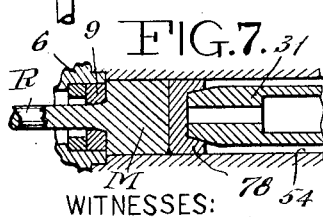
FIG. 6.
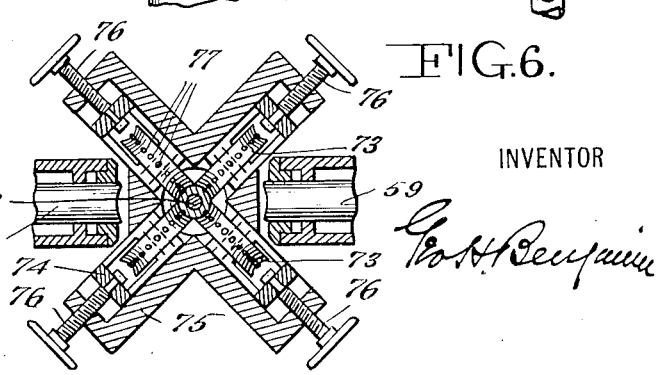
WITNESSES:
INVENTOR

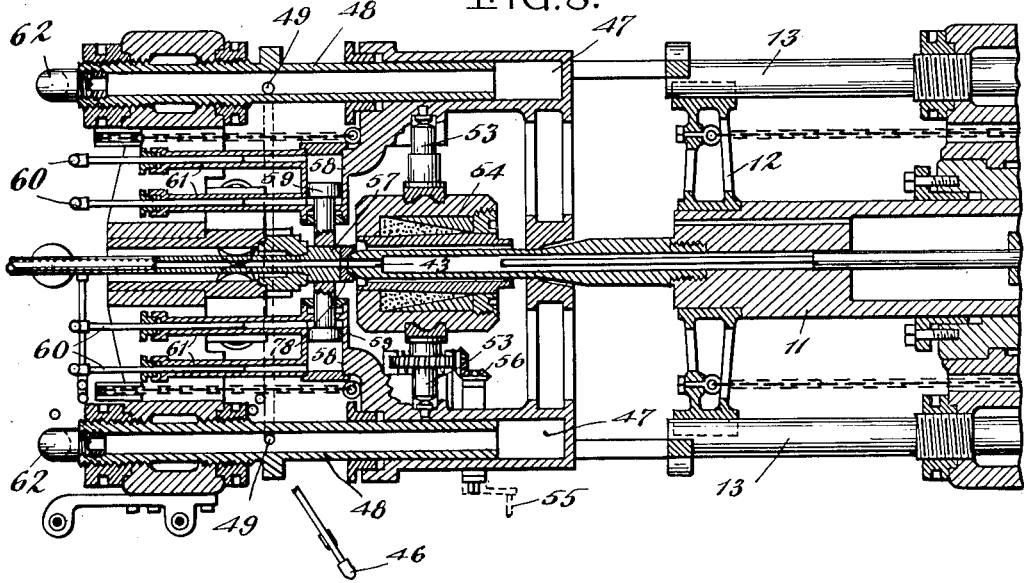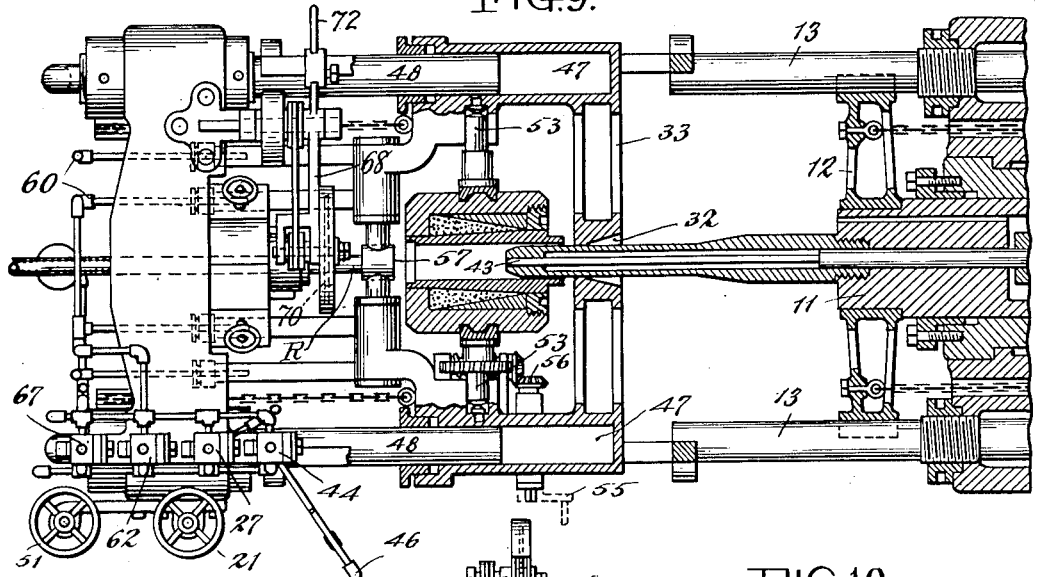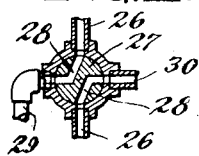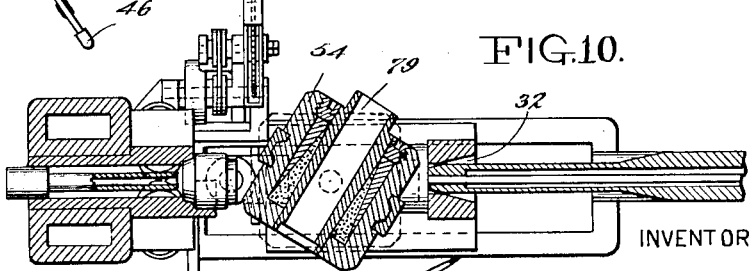

UNITED STATES PATENT OFFICE.

GEORGE H. BENJAMIN, OF NEW YORK, N. Y., ASSIGNOR TO COE BRASS MANUFACTURING COMPANY, A CORPORATION OF CONNECTICUT.

EXTRUSION-MACHINE.

No. 888,299.  Specification of Letters Patent.  Patented May 19, 1908.

Application filed February 7, 1908. Serial No. 414,795.

*To all whom it may concern:*

Be it known that I, GEORGE HILLARD BENJAMIN, a citizen of the United States, residing at the city, county, and State of New York, have invented certain new and useful Improvements in Extrusion-Machines, of which the following is a specification.

My invention relates generally to apparatus employed in the extrusion process of manufacturing solid or hollow wire rods, bars and the like, and more particularly to certain improvements in machines for extruding heated metal, and has for its purpose to decrease the space occupied by the machine, to increase the output of the machine, to decrease the number of men required to operate the machine, and to provide means for controlling all of the operations of the machine from a given locality, and for insuring the extrusion and finishing of a concentrically bored tube when the machine is used for making metal tubes.

In general construction the machine resembles that described in patent of W. A. Wood, No. 819,261; it is also an improvement over the machine described in my copending application, Serial No. 403,382, filed November 22, 1907; but differs therefrom in features which I will now proceed to point out.

The accompanying drawings serve to illustrate the invention, in which

Figure 1 is a horizontal section with parts in plan of the assembled machine. Fig. 2 is a side elevation showing the base in section. Fig. 3 is an enlarged vertical section through line 3' 3' of Fig. 1. Fig. 4 is a vertical section of one of the main controlling valves. Fig. 5 is a transverse section taken on the line V V of Fig. 1 and looking from the left. Fig. 6 is an enlarged transverse section showing the rollers. Fig. 7 is a transverse section of the container with parts broken away and showing the use of a perforated pusher block. Fig. 8 is an enlarged horizontal section with rear parts broken away and corresponding to the section shown in Fig. 1, but showing the pusher in its forward position and the parts in the position which they will occupy after extrusion has taken place and with the container moved rearwardly from the dieholder. Fig. 9 is an enlarged partial plan and horizontal section illustrating the pusher in a retracted position and the billet head moved away from the die. Fig. 10 is a partial elevation and longitudinal section illustrating the container in position to receive a heated billet. Fig. 11 is a horizontal section through one of the auxiliary controlling valves.

In the drawings, 1 represents any suitable base upon which are secured the end frames 2 and 3. Forming a part of the end frame 2 is a tube 4 open at both ends and provided at its rear end with a socket 5 adapted to receive the dieholder 6. The dieholder 6 has a central bore 7 and is provided with a seat 8 for the die 9. Forming a part of the rear end frame 3 is a hydraulic cylinder 10 in which is located a piston 11. The forward end of the piston 11 is supported and guided in its movement by a carriage 12 adapted to slide horizontally upon guides 13. Connected to the carriage 12 are the counterweights 14, which normally serve to retract the piston 11 into the cylinder 10. Forward movement of the piston 11 is caused by water under pressure admitted through pipe 15, Figs. 1 and 2, controlled by valve 16, which also controls a by-pass outlet 17, Fig. 4. The stem 18 of valve 16 is provided with a screw 19 carried in a threaded member 20 attached to the end frame 2. On the upper end of the valve stem 18 is a hand wheel 21 for controlling the valve. Return movement of the piston 11 is permitted by the escape of water from the cylinder 10 through a pipe 22 controlled by a valve 23 actuated by a piston 24 in a cylinder 25 (see Fig. 2). Piston 24 is controlled by water under pressure admitted through pipes 26 and by means of a manually operated auxiliary valve 27, Figs. 1, 2 and 11, having two passages 28, adapted to admit water from a supply pipe 29 to either side of the piston, or to permit its escape from the cylinder 25 through an exhaust pipe 30.

Secured to the forward end of the piston 11 is a pusher 31, which moves through a centering guide 32 forming part of a second carriage 33. The carriage 33 is supported in guides 100 34 on each side of the machine. The guides 34 are connected with the guides 13 and these guides 34 and 13 on each side of the machine serve collectively as ties for securing the end frames 2 and 3 together.

Located in the rear of the cylinder 10 and fixed relatively thereto is a second cylinder 35. Within the cylinder 35 is the piston 36 and extending forward therefrom through a suitable stuffing box 37 is a piston rod 38, which extends through an elongated cylindrically bored member 39 fixed to the cylinder 10 and arranged axially therein and along which the piston 11 has longitudinal movement. A stuffing box 40 is employed to seal the joint between the piston 11 and the bored member 39. From the piston rod 38, stem 41 projects forwardly through the forward end of the piston 11 and through the pusher 31 which is cored to receive and guide the same. Projecting from the forward end of the stem 41 is a mandrel 42, which is adapted to project through a central opening 43 in the beveled forward end of the pusher 31. This opening 43 serves to center and to guide the mandrel 42.

The piston 36 may be controlled independently by a valve mechanism 44 similar to the valve mechanism shown in Fig. 11, whereby water under pressure may be admitted through the pipe 45 in front of the piston 36 to retract the mandrel 42, at the same time the pipe 46 serving as an escape pipe in the rear of the piston 36. To cause a forward movement of the mandrel 42 fluid under pressure may be admitted through pipe 46 behind the piston 36, at this time the pipe 45 serving as an exit for fluid in front of the piston 36. It will be noted that the piston 36 may be operated independently of the piston 11, and also that it has a positive movement in both directions, such movement of the piston 36 causing a corresponding movement of the mandrel 42.

Situated on each side of the carriage 33 are hydraulic cylinders 47 in which are fitted fixed tubular pistons 48, connected through pipes 49 to a source of water supply controlled by a main valve 50 similar to valve 16 and having attached thereto a controlling wheel 51.

Connected to the forward end of the carriage 33 are counterweights acting through the flexible connections 52 which normally tend to move the carriage 33 forward to the position shown in Figs. 1 and 3.

Mounted on trunnions 53 in the carriage 33 is a container 54 of suitable construction, which may be that shown and which will be described in detail later, and means are provided consisting of a crank 55 and suitable gears 56 for rotating the container from the position shown in Figs. 1 and 3, in which its axis is horizontal, to the position shown in Fig. 10, i. e., from the extruding position to the charging position.

Mounted also on the carriage 33 is a hydraulic holder for the unextruded end 57, Fig. 8, of the billet M that has been subjected to the extruding process. This holder consists of a pair of opposed hydraulic cylinders 58, having pistons 59. These pistons are controlled by water under pressure admitted through the pipes 60 and telescopic connections 61 connecting with opposite ends of the cylinders 58, by means of a manually operated valve 62 similar to the valve 27 and having two passages adapted to permit water from the supply pipe 29 to each side of the pistons 39 or to permit its escape from the cylinders through the exhaust pipe 30.

As described, movement of the carriage 33 toward the rear of the machine is effected by water under pressure admitted through the pipes 49 and fixed tubular pistons 48 to movable cylinders 47 and return movement toward the front of the machine is permitted by the escape of water from the cylinders 47 through the pipes 62 controlled by a valve 63 actuated by a piston 64 in a cylinder 65, Fig. 3. The piston 64 is controlled by water under pressure admitted through pipes 66 by means of a manually operated valve 67 similar to valve 27 having two passages adapted to admit the water from the supply pipe 29 to each side of the piston 64 or to permit its escape from the cylinder 65 through the exhaust pipe 30.

Journaled in an arm 68 pivotally mounted in a suitable support 69 attached to the forward end frame 2 of the machine is a power-driven saw 70. On the opposite end of the arm 68 is an adjustable counterweight 71, which normally carries the saw to the position shown in Fig. 5. The end of the arm 68 which is provided with said counterweight 71, has a handle 72, by means of which the saw may be depressed and brought into contact with the body R extruded through the die 9 substantially as shown in Fig. 9.

Suitably mounted forward of the die holder 6 are adjustable rolls 73. These rolls are shown as being rotatably mounted in the blocks 74, which may be inwardly and outwardly adjusted in the ways 75 by means of the screws 76. The ways 75 are shown as extensions of the tubular member 4. The flanges of the rolls 73 may be suitably scored or otherwise formed to impart a finish to the extruded member R, as, for instance, they may be concave as shown and provided with a series of scorings 77 to impress any desired ornamentation upon the surface of the extruded member R. These rolls may be mounted as idlers as shown, or they may be power-driven to accord with the speed of the extruded member R as desired. The rolls located on opposite sides of the mandrel 42 may serve as operating rods as described, but also have the function of centering the mandrel 42, as will presently be seen.

It will be clear from the drawings and from the foregoing description that, by manipulating the wheel 21 and the valve 27, the piston 11 is caused to move horizontally forward and backward; that by manipulating the valve 62, the pistons 58 can be moved in or out to hold or release the extruded end 57 of the billet; that by manipulating the wheel 51 and the valve 67, the carriage 33 may be caused to move forward and backward to alter the position of the container; and that, by manipulating the valve 44, the piston 36 may be caused to move forward and backward to alter the position of the mandrel 42.

The pipe and valve system employed in the entire machine is such as is common with hydraulic apparatus and will be fully understood by those skilled in the art without giving any further description. Any system of pipes and valves which will effect manipulation of the parts will be within the intent of my invention.

The general operation of the machine is as follows: The heated billet M in the form of an axially perforated or cored cylinder is provided and then is introduced into the upper end of the bore cavity of the container 54 when it occupies the position shown in Fig. 10. A pushing block 78 having a diameter approximating that of the cylindrical bore 79 of the container 54 and axially perforated by a cylindrical hole corresponding to the perforation 43 and to the size of the mandrel 42, if tubing is to be extruded, and unperforated, as illustrated in Fig. 7, if a wire or bar is to be extruded, it is then placed in the cavity of the container 54 in the rear of the billet. The pushing block 78 has a recess in its rear end shaped to receive the tapered front end 80 of the pusher 31. After the introduction of the heated billet in the pushing block 78, the container is moved into a horizontal position as illustrated in Fig. 1. By manipulating the valve 67 and relieving the water pressure in the pistons 47, the counterweight connections 52 will move the carriage 33 forward until the container abuts against the dieholder 6, as shown in Figs. 1 and 3. At this time the pistons 59 will be retracted within the cylinders 58, the carriage, container and pistons 59 occupying the position shown in Fig. 1. The valve 44 will then be manipulated and water pressure will be exerted back of the piston 36, causing the mandrel 42 to advance through the axial core of the heated billet, through the die 9 and dieholder 6, so that its end terminates adjacent the rolls 73. This mandrel 42 may be properly centered with respect to the die 78 by the rolls 73 by slipping over its projecting forward end a short section 81 of tubing corresponding to the tubing to be extruded through the die 78 and having a perforation corresponding to the mandrel 42. The rolls 73 may be screwed down against the short length of tubing 81 into proper position to center the mandrel, and, if desired, to operate upon the extruded member R. When the parts are in the position just described, the operation of extrusion may be commenced. The hand wheel 21 will then be manipulated and water pressure will be exerted back of the piston 11, thereby causing the pusher 31 guided and centered by means 32 to enter the recess of the pushing block 78, force said block through the bore of the container 54 and drive the heated metal M through the die 9 and about the mandrel 42 to form the tube R. As soon as the extruded member R reaches the inner end of the short section of tube 81 used in centering the mandrel, this short section of tube is pushed out of the way and the member R passing across the flanges of the rolls 73 to be operated upon thereby, the mandrel 42 still being centered, and subsequently passing out of the forward end of the machine as shown in Fig. 3.

When the position of the extruded body shown in Fig. 3 is reached, that is, when such portion of the billet to be extruded as experience has shown is profitable to extrude is extruded, valve 16 may be closed and valve 44 may be manipulated to cause the retraction of the mandrel 42 by the application of water pressure in front of the piston 36; hand wheel 51 will then be manipulated, which opens valve 50 thereby causing water pressure to be exerted within the cylinders 47, causing the carriage 33 carrying the container and cylinders 58 to move backward from the position shown in Figs. 1 and 3 to the position shown in Fig. 8.

As the position of the pusher 31 has not been changed, this backward movement of the carriage 33 causes the unextruded end or head 57 of the billet M to be forced out of the container or otherwise to occupy the position shown in Fig. 8. In this position, the cylinders 58 occupy a position alongside of the billet head 57 and by manipulating the valve 62, the pistons 59 can be caused to engage the billet head and hold the same fast. By now manipulating the valve 27, water may be allowed to escape from the cylinder 10, the counterweights 14 retracting the piston 11 and the pusher 31 so as to occupy the position shown in Fig. 9. By this operation the pushing block 78 will be released by the pusher 31 and the block will drop to the base of the machine. If, now, further water pressure be exerted within the cylinders 47, billet head 57 will be retracted into the position shown in Fig. 9. When the parts are in this position, by manipulating the handle 72, the saw 70 can now be brought down to cut off the billet head 57 from the extruded tube R. The extruded tube R is then drawn out of the machine, the pistons 59 retracted into the cylinders 58, releasing the billet head, which will fall to the base. The valve 67 is then manipulated to permit water to escape from the cylinders 47, whereupon the carriage 33 will be moved forward by means of the counterweights until the container is free from the end of the pusher 31 and in a position to be turned to receive a new billet.

In case it may be desired to extrude rods instead of tubes, a non-perforated pusher block as illustrated in Fig. 7 may be employed, in which case the piston 36 is held retracted in the cylinder 35, so that the mandrel 42 is not employed to form an opening or bore in the extruded member. Although even when extruding rods, the mandrel may be serviceable for properly adjusting the rolls 73, as for instance, when in its forward position a length of tube 81 of the proper diameter may be slipped over it and the rolls 73 adjusted to the periphery of this tube.

The container 54 may comprise the inner tube 82 cylindrically bored and socketed at the delivery end as shown to take over the dieholder 6; an outer concentric shell 83 flanged at the delivery end to engage the inner tube 82 and providing an intermediate chamber to contain heat non-conducting material 84, which may be solidly packed trap rock, as shown; a forwardly tapering wedge ring 85 forces the trap rock tight against the tube 82 and may be clamped in place by the ring 86 having threaded engagement with the shell 83, which will permit further clamping when necessary. The ring 86 may be screwed down by suitable means or by a key inserted in the sockets 87. It will be noted that the body of the heat non-conducting material is localized principally toward the delivery end where most required.

It will be seen from the foregoing description that but three men are required to operate the machine, one man introducing the heated billet, manipulating the saw and removing the heated billet, a second man, on the other side of the machine assists in introducing the billet into the container and controls the position of the container through the crank 43, and a third man on the same side of the machine manipulates the hand wheels 21 and 51, and the valves 44, 27, 62 and 67, and the short length of tubing 81.

It will, therefore, be observed that the mechanism for performing the necessary operations is contained wholly within the machine frame between the end frames 2 and 3, thereby rendering the machine compact and doing away with all the additional frames and carriages commonly employed with extrusion machines.

It will also be understood that the machine is equally applicable for the extrusion of tubing or rods and for the extrusion of bars of varying diameters according to the die and mandrel employed. It should also be noted that means is employed for holding the mandrel 42 in central position from both in front and in rear of the die before and during the process of extrusion.

I wish it understood that many changes may be made in the construction of the various parts illustrated and described without departing from the intent of my invention.

Having thus described my invention, I claim:

1. An extrusion machine comprising a container adapted to contain a heated billet, a die for the delivery end of the container, a mandrel adapted to extend forwardly through said die, a pusher, and means forward of said die for centering said mandrel.

2. An extrusion machine comprising a container adapted to contain a heated billet, a die for the delivery end of the container, a mandrel adapted to extend forwardly through said die, a pusher, and a set of rolls forward of said die for centering said mandrel.

3. An extrusion machine comprising a container adapted to contain a heated billet, a die for the delivery end of the container, a mandrel adapted to extend forwardly through said die, a pusher, and means forward and in the rear of said die for centering said mandrel.

4. An extrusion machine comprising a container adapted to contain a heated billet, a die for the delivery end of the container, a mandrel adapted to extend forwardly through said die, a pusher, a set of operating rolls on opposite sides of said mandrel for finishing the surface of the extended member and operating to center said mandrel.

5. The method of extruding metal tubing consisting of the provision of a hollow heated metal billet, the location of a mandrel within said hollow billet, and the extruding of the metal about said mandrel and through a die.

6. The method of extruding metal tubing consisting of the provision of a hollow heated metal billet, the location of a mandrel within said hollow billet, the extruding of the metal about said mandrel and through a die, and then passing the extruded tube between rolls located on opposite sides of said mandrel.

7. The method of extruding metal tubes consisting of forming an axially cored heated cylindrical billet outside of the container, placing said billet within the container, and extruding the same through a die and about a centered mandrel.

8. The method of extruding metal tubes consisting in forming an axially cored cylindrical billet of greater external and internal diameters than the external and internal diameters respectively of the required tube, positively centering a mandrel within a die, and extruding said billet through said die and about said mandrel to determine the respective diameters of the extruded tube.

9. A container for extrusion machines comprising an inner tube with an outer shell flanged at the delivery end to engage said inner tube and providing a concentric chamber about said tube, a filling of heat non-conducting material for said chamber, a concentric wedge ring for compressing said filling about said tube, and clamping means at the rear of said shell for retaining said wedge ring.

In testimony whereof, I affix my signature, in the presence of two witnesses.

GEORGE H. BENJAMIN.

Witnesses:
LEONARD DAY,
PAUL H. MARROW.